United States Patent Office 3,606,385
Patented Sept. 20, 1971

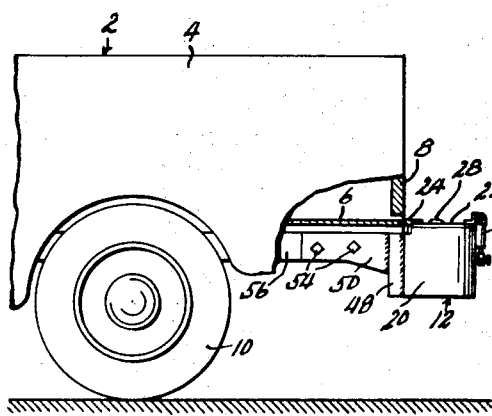

3,606,385
COMBINATION MOTOR VEHICLE BUMPER
John H. Johannes, Rte. 1, Robinson, Kans. 66532
Filed Nov. 5, 1968, Ser. No. 773,481
Int. Cl. B60d *1/06, 1/08;* B60r *11/06*
U.S. Cl. 280—422      2 Claims

ABSTRACT OF THE DISCLOSURE

A bumper constituting a tool box adapted to be mounted at the rearward end of a truck in the position of and to perform the functions of a buffer, with a hitch and an electrical socket for trailers, farm implements and the like recessed in the rearward side thereof.

---

This invention relates to new and useful improvements in automotive accessories, and has particular reference to a tool box-bumper combination for use in connection with pick-up trucks or the like.

A principal object of the present invention is the provision of a tool box having the general form of a vehicle bumper, and adapted to be mounted across the rearward end of a truck in the usual position of the bumper. In this position, it not only performs the usual functions of a bumper, but also renders tools readily available at a place they are most commonly required, as for example in performing various operations on the truck or its load, or on trailers or implements towed behind the truck. It also provides a ledge on which an operator may stand to obtain convenient access to the truck bed, such a ledge being conspicuously lacking in many trucks of modern design.

Another object is the provision of a tool box-bumper of the character described in which trailer hitches are set in the rearward wall thereof for convenient attachment of trailers, farm implements or the like to be towed. The box is specially reinforced in order that the comparatively thin box walls are not required directly to support either the tensile load of towing a trailer, or a compressive load if the bumper is used for pushing. The hitch elements are recessed to leave the rear wall smooth for pushing, and as a safety measure by eliminating projections which could inflict injuries on bystanders.

Other objects are simplicity and economy of construction, and efficiency and dependability of operation.

With these objects in view, as well as other objects which will appear in the course of the specification, reference will be had to the accompanying drawing, wherein:

FIG. 1 is a fragmentary side elevational view, partially broken away, of the rearward portion of a pick-up truck, showing a combination tool box, bumper and trailer hitch embodying the present invention mounted operatively thereon, FIG. 2 is a rear elevational view of the same, FIG. 3 is an enlarged, fragmentary sectional view taken generally on line III–III of FIG. 2, FIG. 4 is a sectional view taken on line IV–IV of FIG. 3, and FIG. 5 is a sectional view taken on line V–V of FIG. 3.

Like reference numerals apply to similar parts throughout the several views, and the numeral 2 applies generally to the rearward portion of a pick-up truck, shown fragmentarily, the bed thereof being indicated at 4, said bed having a floor 6 (FIG. 1) and, at its rearward end, a tailgate 8 adapted to be pivoted outwardly and downwardly. The tailgate is of course spaced well to the rear of the rear vehicle wheels 10.

The combination tool box-bumper of the present invention includes a generally rectilinear box 12 formed of sheet steel or the like with its major dimension extending transversely to the vehicle and being slightly greater than the width of bed 4 thereof. Said box includes a floor 14, a vertical front wall 16, a vertical rear wall 18, end walls 20, and a horizontal cover 22 hinged along its forward edge, as at 24, to the upper edge of front wall 16, so as to open upwardly and forwardly. Said cover is adapted to be secured closed by latch members 26 of any suitable type releasably connecting its rearward edge to the upper edge of rear wall 18, and to be locked closed when desired by a key lock 28 (see FIG. 5) having a bar 30 which is horizontally movable into a slot 32 formed therefor in rear wall 18.

The central portion of rear wall 18 of the box is offset forwardly, or inwardly of the box, to form an external recess 34. Extending horizontally across the lower portion of said recess, and welded therein, is a heavy bar 36 to the midpoint of which is affixed the ball element 38 of a trailer hitch of ordinary design. The rearward edge of bar 36 does not project rearwardly of rear box wall 18, but is flush with or forward of said wall. Similarly, a second bar 40 extends horizontally across and is welded in the upper portion of recess 34, and is flush with or positioned forwardly of rear box wall 18. Bar 40 has a hole 42 (see FIG. 5) formed therethrough at its midpoint, and serves as a towing hitch for farm implements or the like having clevis-type towing fixtures, a clevis being adapted to be engaged over bar 40 and secured thereto by a clevis pin inserted through said clevis and through hole 42.

A heavy duty pipe 44 has its rearward end welded into rear wall 18 of the box at the forwardmost portion of recess 34 and at the midpoint of the box, and extends horizontally and forwardly intermediate floor 14 and cover 22 of the box. At its forward end, pipe 44 extends through front wall 16 of the box, and through the web of a horizontal, transversely extending channel iron 46 welded to the external surface of said front wall. Pipe 44 is securely welded to both wall 16 and channel iron 46, and provides an open passageway from a point forward of the box into the rear recess 34 thereof. Each end of channel iron 46 is welded to a vertically extending angle iron 48 which is in turn welded to front-wall 16 of the box. Welded to each of angle irons 48 is the rearward end of a forwardly extending tongue 50. Each of said tongues is provided with drilled holes 52 (see FIG. 5) for receiving bolts 54 for securing said tongues firmly to main frame elements 56 of the truck. A cable 58, containing electrical lead wires from the usual electrical system of the truck for various electrically operable devices of a trailer, such as tail lights, turn signals, electric brakes and the like, may be threaded rearwardly through pipe 44, and operably connected to a socket member 60 fitted into the rearward end of said pipe. The electrical "pigtail" of a trailer connected, for example, to hitch ball 38, may then be plugged into socket 60.

To install the device, the usual rear bumper of the truck is first removed, and box 12 mounted as shown by means of bolts 54. The box is mounted in the identical manner of the usual bumper, and the box tongues 50 may be provided with bolt holes 52 in the same pattern as the standard bumper mount, to match holes provided therefor in the truck frame. Box 12 then has the position shown, extending transversely across the rear of the truck in the general position of the usual bumper, low enough so as not to interfere with the downward and rearward opening of the truck tailgate 8. It also performs the functions of the usual bumper, being constructed with sufficient sturdiness for this purpose. Its form imparts thereto many of the strength characteristics of a hollow box beam so that it possesses high resistance to bending forces in proportion to its weight.

The box provides a receptacle for tools and other equipment at a position most handy to the operator, for example in performing various operations on the contents of truck bed 4, or on a trailer, farm implement or the like being towed therebehind. The cover 22 of the box forms a ledge on which an operator may stand to obtain convenient access to the load in bed 4. Such ledges or other comparable access means are notably absent in modern, streamlined truck designs. The bars 36 and 40 of the hitch means form convenient steps by means of which the operator may climb to the level of cover 22.

Bar 36 with its hitch ball 38, and bar 40 with its hole 42, form convenient, built-in means whereby vehicles having either ball hitches or clevis hitches may conveniently be attached to the truck for towing. Moreover, these hitch means are recessed into the rear wall of the box, so as not to form projections which could interfere with the use of the box as a pushing device, and which could constitute injury hazards to nearby persons.

Pipe 44, extending from front to rear through box 12, not only as previously described provides a passage for electrical cable 58 to receptacle 60 at the rear of the box, into which the electrical systems of trailers may be plugged, but also combines with channel iron 46 and angle irons 48 to form a greatly reinforced "frame" extending between and interconnecting hitch bars 36 and 40 to tongues 50, and through said tongues to truck frame members 56. Thus the box walls themselves, which are relatively thin and poorly adapted to support either a tensile or a compressive load between the front and rear walls, are not required to support either the tensile load of pulling a trailer, or the compressive load if the box-bumper is used for pushing. Instead, these loads are supported by "frame" 44–46–48. It is of course for this reason that pipe 44, as well as members 46 and 48, should be of strong, heavy-duty weight.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A tool box for use in automotive vehicles comprising:
   (a) a hollow, elongated box adapted to contain tools and the like, said box being adapted to be extended transversely behind said vehicle in the general position of and in substitution for the usual rear bumper of said vehicle, whereby to perform the functions of said bumper, said box including generally vertical front and rear walls,
   (b) means for attaching said box firmly to said vehicle comprising a reinforced frame rigidly affixed to said front wall and adapted to be affixed to said vehicle,
   (c) a tensile member affixed at its forward end to said frame, extending rearwardly through said box, and affixed at its rearward end to said rear wall, said tensile member constituting a hollow tube opening both forwardly and rearwardly of said box,
   (d) an electrical outlet fixture mounted fixedly in the rearward end portion of said tube, into which the electrical system of a trailer may be connected,
   (e) an electrical cable operatively connected to said fixture and extending forwardly through said tube for connection to the electrical system of said automotive vehicle, and
   (f) hitch means carried exteriorly of said box at the rearward side thereof immediately adjacent the rearward end of said tubular tensile member, whereby trailers or the like to be towed by said vehicle may be attached thereto.

2. The structure as recited in claim 1 wherein said reinforced frame includes stiffening members affixed to said front wall and tongues affixed to said stiffening members and extending forwardly for attachment to said vehicle, a portion of the rearward wall of said box being offset forwardly to provide a rearwardly opening recess therein, and wherein said hitch means means comprises a pair of horizontal bars extending transversely across said recess in vertically spaced apart relation, and projecting no farther rearwardly than the general vertical plane of said rear wall, one of said bars having the ball portion of a ball type towing hitch affixed thereto, and the other of said bars having a hole formed vertically therethrough for the reception of the clevis pin of a clevis type towing hitch.

References Cited
UNITED STATES PATENTS

| | | | |
|---|---|---|---|
| 1,609,274 | 11/1926 | McFadden | 224—42.03 |
| 2,000,999 | 5/1935 | Suchland | 280—422X |
| 2,492,914 | 12/1949 | Barden | 293—69X |
| 2,993,721 | 7/1961 | Bowman | 293—69 |
| 3,318,617 | 5/1967 | Burns | 280—500 |
| 3,338,614 | 8/1967 | Saddler, Jr. | 280—500 |
| 3,471,070 | 10/1969 | Olson | 224—42.04 |
| 3,501,170 | 3/1970 | Da Valle | 293—69X |

ARTHUR L. LA POINT, Primary Examiner

H. BELTRAN, Assistant Examiner

U.S. Cl. X.R.

224—42.03, 42.04; 280—500, 511; 293—69